(No Model.)

G. W. RICHARDSON.
SAFETY VALVE.

No. 325,273. Patented Sept. 1, 1885.

WITNESSES
J. M. Dolan.
Fred. B. Dolan.

INVENTOR
Geo. W. Richardson

UNITED STATES PATENT OFFICE.

GEORGE W. RICHARDSON, OF MEDFORD, MASSACHUSETTS.

SAFETY-VALVE.

SPECIFICATION forming part of Letters Patent No. 325,273, dated September 1, 1885.

Application filed March 14, 1885. (No model.)

*To all whom it may concern:*

Be it known that I, GEORGE WILLIAM RICHARDSON, of Medford, in the county of Middlesex and State of Massachusetts, a citizen of the United States, have invented a new and useful Improvement in Automatic Relief Safety-Valves, of which the following is a full, clear, and exact description, reference being had to the accompanying drawings, forming a part of this specification, in explaining its nature.

It is a well-known fact that in the construction of safety-valves it is necessary to have the abutting faces of the valve-head and the valve-seat fit very accurately together, and they are usually ground together, forming what is technically known as a "ground joint." These surfaces are the surfaces which the load on the valve brings in contact with each other, and are specially liable to abrasion, wear, and cutting from the action of the steam. This last cutting action from wire-drawn steam is not so destructive in the case of pop safety-valves, or those which have an additional lifting area on which the steam acts in raising the valve on the valve-head, as on the valve-seat.

In Letters Patent No. 82,270, of September 22, 1868, to Edward H. Ashcroft, a facing or contact bushing was provided for the ground joint, which facing or bushing was made of an indestructible and hard metal applied to both of the abutting surfaces.

Having been engaged in the manufacture of valves embodying more or less the invention of this Ashcroft patent, I have discovered that a single facing or bushing applied to the seat alone of the valve is better than a face or bushing applied to both of the abutting surfaces of the ground joint, and that the valve-head may be made of a homogeneous bronze, like gun or steam metal, if the valve-seat is made of the hard alloy, and very little danger of abrasion or injury to the joint will take place.

Figure 1:
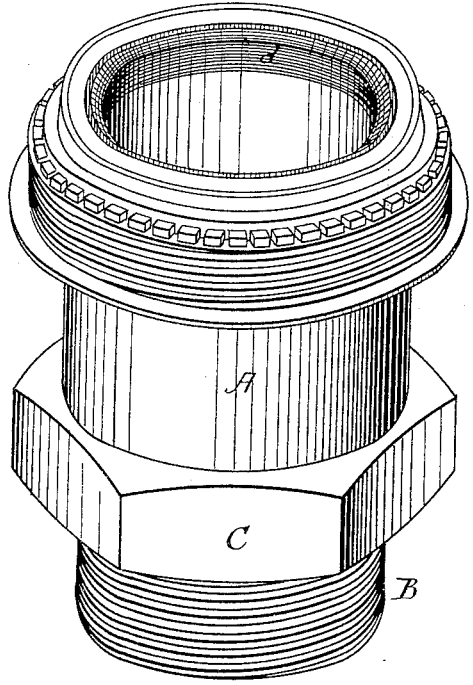
Figure 2:
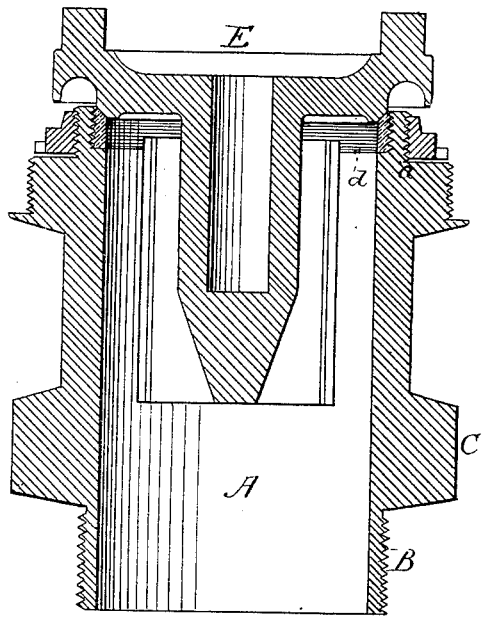
Figure 3:
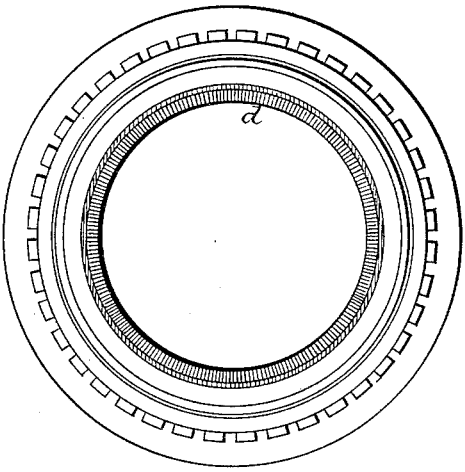

In the drawings, Figure 1 is an elevation of what is known as the bush of a safety-valve. Fig. 2 is a vertical section through the bush and valve, showing a pop-valve with an adjustable ring, and with a hard-metal bushing or facing forming the seat of the valve screwed into the top of the bush. Fig. 3 is a plan view of the top of the bush.

In the drawings, A is the cylindrical part of the bush, provided with a screw, B, at the bottom, and with a nut, C, to take hold of with a wrench to screw the bush in place, which bush forms a cylindrical steam-pipe leading to the bottom of the safety-valve. At the top of this cylindrical conduit is a recess, $a$, which is screw-threaded upon its inside, and has inserted into it a ring, $d$, of hard non-corrodible metal alloy, which for this purpose, upon the whole, I prefer to compose of about sixty per cent. pure nickel and forty per cent. copper. In order to fuse this compound and make it homogeneous throughout, it is advisable to remelt it several times. If this be not done, the ring is liable to be honeycombed more or less with blow-holes, and the presence or absence of these blow-holes may be recognized by the clearness with which this nickel-bronze casting will ring when struck.

The valve proper (represented in Fig. 2 in section at E) I make of bronze, steam, or gun metal. The ring, of about sixty per cent. nickel-bronze, has a screw-thread cut upon its exterior, and is screwed down into its place in the bush A, and the bevel or finish of the valve-seat made upon it, and the seating of this ring $d$ is then ground together with the seating of the valve proper, E, after the bushing-ring $d$ is put into its position. There is a considerable economy in this method of manufacture, because where both surfaces are of the harder alloy it is difficult to insert or attach the alloy to the valve-head E except by setting it in the mold of the valve-head and casting the gun-metal or other material of the valve about it, letting the bushing ring or seating of the valve proper, E, unite with the other material in the mold.

In the Ashcroft patent referred to, both the valve-seat and the valve-head are prescribed to be made of anti or non corrosive metal, and undoubtedly in the common safety-valve, where the lift is slight and steam is apt to be wire-drawn and exert its maximum influence, this method of facing both abutting surfaces with non-corrodible alloy is a correct principle; but in the pop safety-valve, where the valve is raised several times as high as the ordinary valve is raised, the wire-drawing of the steam is not so noticeable and its effect in cutting or injuring the seating of the valve not so extensive as with the common safety-valve, and a gun-metal valve-head is fully as good for use as a valve-head faced or seated with the non-corrodible metal, and is less costly and better to manufacture, because the metals grind together better.

Safety-valves in use are exposed at the ground joint to the action of steam of high temperatures. This action is both abrasive and corrosive. When the valve lifts, the steam, beginning to escape through the ground joint, corrodes and abrades the two contact-surfaces of the ground joint. To reduce this action to a minimum, the nickel-seated valve, well known in the market, was invented by Ashcroft. In this the top of the bush and the "feather" or movable part of the valve, sometimes called the "valve proper," were both armored at their ground-joint regions with hard incorrodible nickel-bronze. This armor was easily applied to the bush, for it could be set in as a ring. It was not easily applied to the feather, for then a fused union was considered desirable. Now, although on valves with slight lift, such as common safety-valves, the abrasion is comparatively equal, in valves of considerable lift, such as are called "pop-valves," a series of exhaustive experiments have shown that the action of steam is more destructive to the valve-seat than to the valve-head, so that by clothing the bush portion of the ground joint with the nickel-bronze armor, and making the valve portion of the ordinary gun-metal bronze used for the operative parts of safety-valves, a pop safety-valve with only the bush in nickel armor is nearly if not quite as durable as one in which both portions of the ground joint are nickel-armored, and thus these experiments have disclosed that the more expensive half of the Ashcroft patented contrivance may be dispensed with in a pop safety-valve, and the least expensive half retained with very slight loss, if any, of the useful effect.

I therefore claim as my invention and desire to secure by Letters Patent of the United States—

In the construction of pop safety-valves, the valve-bush A, faced at its upper extremity with a seating-bush, $d$, inserted therein, which seating-bush is composed of a hard non-corrodible metal, in combination with a valve proper, E, of a comparatively homogeneous and softer quality, and less resistant to corrosion than the metal of the seating-bush $d$, substantially as and for the purposes described.

GEO. W. RICHARDSON.

Witnesses:
THOS. WM. CLARKE,
F. F. RAYMOND, 2d.